United States Patent
Crouse

(10) Patent No.: US 11,266,483 B2
(45) Date of Patent: Mar. 8, 2022

(54) MOUTH PIECE REMOVAL TOOL

(71) Applicant: James M. Crouse, Salisbury, MD (US)

(72) Inventor: James M. Crouse, Salisbury, MD (US)

( * ) Notice: Subject to any disclaimer, the term of this patent is extended or adjusted under 35 U.S.C. 154(b) by 446 days.

(21) Appl. No.: 16/049,998

(22) Filed: Jul. 31, 2018

(65) Prior Publication Data

US 2020/0038141 A1  Feb. 6, 2020

(51) Int. Cl.
*A61C 7/02* (2006.01)
*A63B 71/08* (2006.01)
*A61C 7/08* (2006.01)

(52) U.S. Cl.
CPC .............. *A61C 7/023* (2013.01); *A61C 7/08* (2013.01); *A63B 71/085* (2013.01)

(58) Field of Classification Search
CPC .. A61C 7/023; A61C 7/08; A61C 7/02; A61C 7/146; A61C 3/16; A61C 3/00; A61C 3/14; A61C 8/00; A61C 13/01; A61C 19/02; A61C 15/00; A61C 15/02; A61C 5/90; A61C 13/38; A61C 3/162; A61C 8/0095; A63B 71/085; A63B 71/08; A61F 5/56; A61F 5/566; Y10T 29/53909; Y10T 29/53943; A46B 2200/1073; A46B 7/06
USPC ........... 128/861; 433/3, 141, 2, 148, 150, 24
See application file for complete search history.

(56) References Cited

U.S. PATENT DOCUMENTS

| | | | |
|---|---|---|---|
| 2,602,998 A | 7/1952 | Sprague et al. | |
| 4,274,826 A | 6/1981 | Huey et al. | |
| 4,609,353 A | 9/1986 | Kline | |
| 4,975,051 A | 12/1990 | Kargas et al. | |
| 5,580,243 A | 12/1996 | Bloore | |
| 7,011,517 B2 | 3/2006 | Nicozisis | |
| 8,152,525 B2 * | 4/2012 | Rossi, III | A61C 3/00 433/167 |
| 8,167,612 B2 | 5/2012 | DeSanti | |
| 8,182,266 B2 | 5/2012 | Creasman et al. | |
| 8,475,166 B1 | 7/2013 | LaMee | |
| 8,545,219 B2 | 10/2013 | Saubers | |
| 10,307,223 B1 * | 6/2019 | Aronson | A61C 7/023 |
| 10,617,488 B2 * | 4/2020 | Block | A61C 3/16 |
| 2006/0046228 A1 * | 3/2006 | Haab | A61C 17/00 433/143 |
| 2007/0031788 A1 * | 2/2007 | Chao | A61C 3/00 433/144 |
| 2007/0072142 A1 | 3/2007 | Staines et al. | |
| 2008/0160473 A1 | 7/2008 | Li et al. | |
| 2008/0265594 A1 * | 10/2008 | Popeil | A47J 43/283 294/26 |

(Continued)

FOREIGN PATENT DOCUMENTS

DE  102008018305 B3 *  8/2009  .............. A61C 3/00

OTHER PUBLICATIONS

Roeck, Karl; Translation of Foreign Publication DE 102008018305 B3; 2008 (Year: 2008).*

*Primary Examiner* — Alireza Nia
*Assistant Examiner* — Daniel A Miller
(74) *Attorney, Agent, or Firm* — Dunlap Bennett & Ludwig, PLLC; Anna L. Kinney

(57) ABSTRACT

A mouth piece removal tool. The mouthpiece removal tool includes an elongated handle having a first end opposite a second end. A first hook extends perpendicular from the second end of the elongated handle. The first hook includes a pointed tip curving upwards.

10 Claims, 3 Drawing Sheets

(56) References Cited

U.S. PATENT DOCUMENTS

| | | | | |
|---|---|---|---|---|
| 2009/0286199 A1* | 11/2009 | Creasman | ............... | A61C 3/00 |
| | | | | 433/141 |
| 2012/0009542 A1 | 1/2012 | Keddington et al. | | |
| 2015/0335396 A1* | 11/2015 | Block | ..................... | A61C 7/02 |
| | | | | 433/147 |
| 2016/0067014 A1 | 3/2016 | Kottemann et al. | | |

* cited by examiner

MOUTH PIECE REMOVAL TOOL

BACKGROUND OF THE INVENTION

The present invention relates to removing mouth pieces and, more particularly, to a mouth piece removal tool.

Mouth pieces, such as clear orthodontic aligners, retainers, and mouth guards, can be difficult to remove. Additionally, to remove mouth pieces, patients must put their fingers in their mouth, which can be unpleasant. Further, removing mouth pieces can cause fingernails to break.

The existing tools for removal are difficult to use in the posterior part of the mouth which is where the mouth pieces should be removed from. The lower posterior teeth tend to tip in towards the tongue and this makes it difficult to engage existing hooks.

As can be seen, there is a need for an improved mouth piece removal tool.

SUMMARY OF THE INVENTION

In one aspect of the present invention, a mouth piece removal tool comprises: an elongated handle comprising a first end opposite a second end; a first hook extending perpendicular from the second end of the elongated handle, wherein the first hook comprises a pointed tip curving upwards, and the mouth piece removal tool is made of a polymer.

In another aspect of the present invention, a mouth piece removal tool comprises: an elongated handle comprising a first end opposite a second end; a head portion extending downward from the second end of the elongated handle; a first hook extending laterally from a first side of the head portion; and a second hook extending laterally from a second side of the head portion, the second side being opposite the first side, wherein each of the first hook and the second hook comprise a pointed tip curving upwards.

In another aspect of the present invention, a method of removing a mouth piece comprises steps of: providing a mouth piece removal tool comprising: an elongated handle comprising a first end opposite a second end; and a first hook extending perpendicular from the second end of the elongated handle, wherein the first hook comprises a pointed tip curving upwards; inserting the second end of the elongated handle into a mouth of a user; placing the pointed tip of the first hook underneath a bottom edge of a mouth piece; and lifting or rotating the elongated handle, thereby displacing the mouth piece from the user's teeth.

These and other features, aspects and advantages of the present invention will become better understood with reference to the following drawings, description and claims.

DETAILED DESCRIPTION OF THE INVENTION

Figure 1:
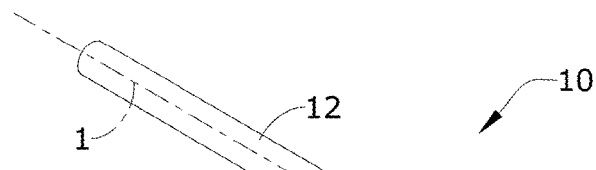
FIG. 1 is a perspective view of an embodiment of the present invention.
Figure 2:
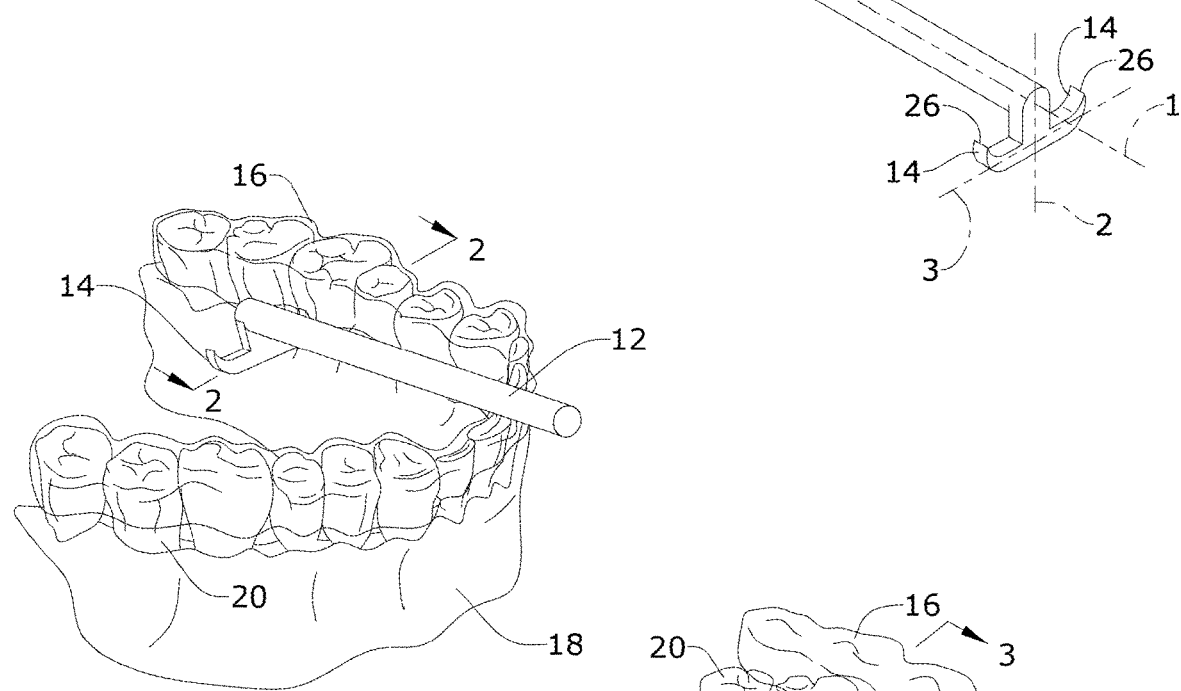
FIG. 2 is a perspective view of an embodiment of the present invention in use.
Figure 3:
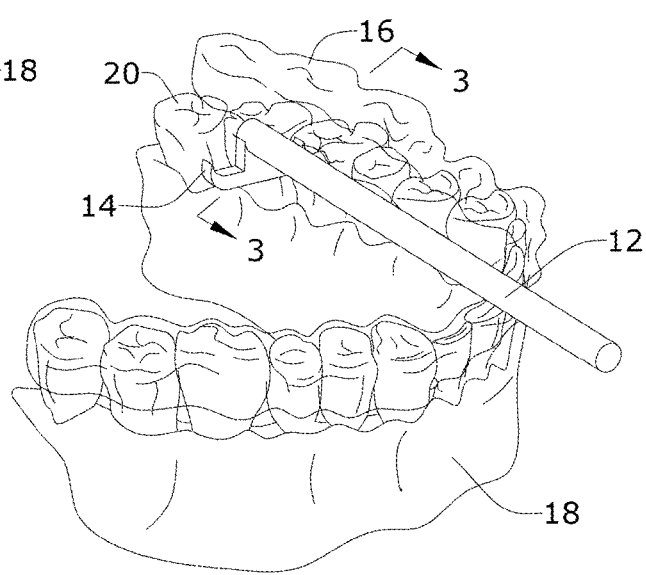
FIG. 3 is a perspective view of an embodiment of the present invention in use.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a tool for the removal of mouth pieces, such as clear orthodontic aligners, retainers and mouth guards, from the mouth. The tool incorporates a double ended hook (like an anchor) that is about 90 degrees relative to the handle so that the handle is outside of the mouth and can fulcrum off the anterior teeth to remove the mouth piece via a lever action or a rotational action. The hook being at 90 degrees from the handle allows the hook to engage the edge of the mouth piece with the handle parallel to the teeth. The hook can engage the mouth piece in the back of the mouth without having to open wide and leaving the fingers outside of the mouth.

Referring to FIGS. 1 through 5, the present invention includes a mouth piece removal tool 10. The mouth piece removal tool 10 includes an elongated handle 12 having a first end opposite a second end along a first longitudinal axis 1. A first hook 14 extends perpendicular from the second end of the elongated handle 12. The first hook 14 includes a pointed tip or beveled edge 26 curving upwards.

The mouth piece removal tool 10 may be made of a polymer so that the tool 10 does not damage a user's teeth 20 or gums 18. The polymer may include a non-toxic plastic that is stiff and not prone to breaking easily, such as polypropylene, polyethylene, or a combination thereof. The present invention may be made by injection molding of plastic.

The handle 12 of the present invention may be an elongated cylinder. In certain embodiments, the handle 12 may be linear. The handle 12 may include a length to allow a user to insert the mouth piece removal tool 10 and dislodge a mouth piece 16 from the user's teeth 20 without inserting their fingers into their mouth.

The present invention may further include a head portion 11 having a second longitudinal axis 2 extending downward from the second end of the elongated handle 12. The head portion 11 may be perpendicular relative to the elongated handle 12. The first hook 14 laterally extends from a first side of the head portion 11 along a third longitudinal axis 3. The first hook 14 may be perpendicular relative to the elongated handle 12 and the head portion 11.

In certain embodiments, the present invention may further include a second hook 14 laterally extending from a second side of the head portion 11, the second side being opposite the first side. The second hook 14 includes a pointed tip curving upwards similar to the first hook 14. The second hook 14 allows the user to dislodge the mouth piece 16 on either side of the mouth.

Figure 4:
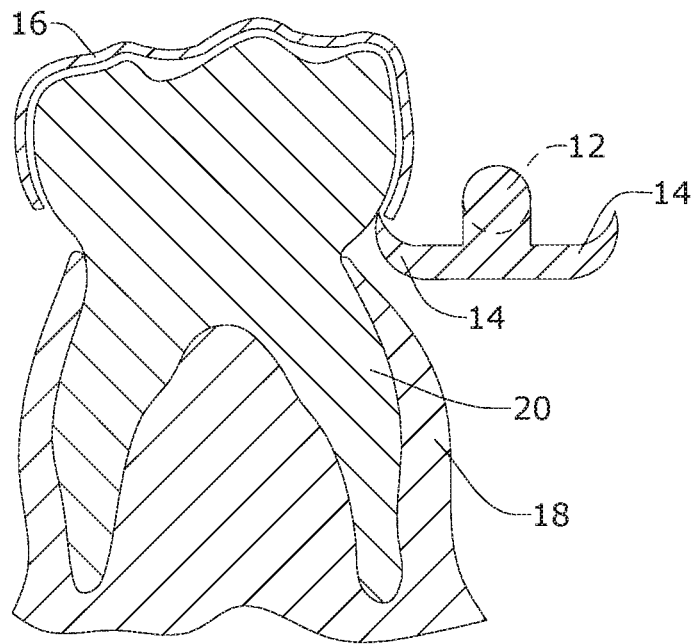
FIG. 4 is a section view of the present invention taken along line 2-2 in FIG. 2.
Figure 5:
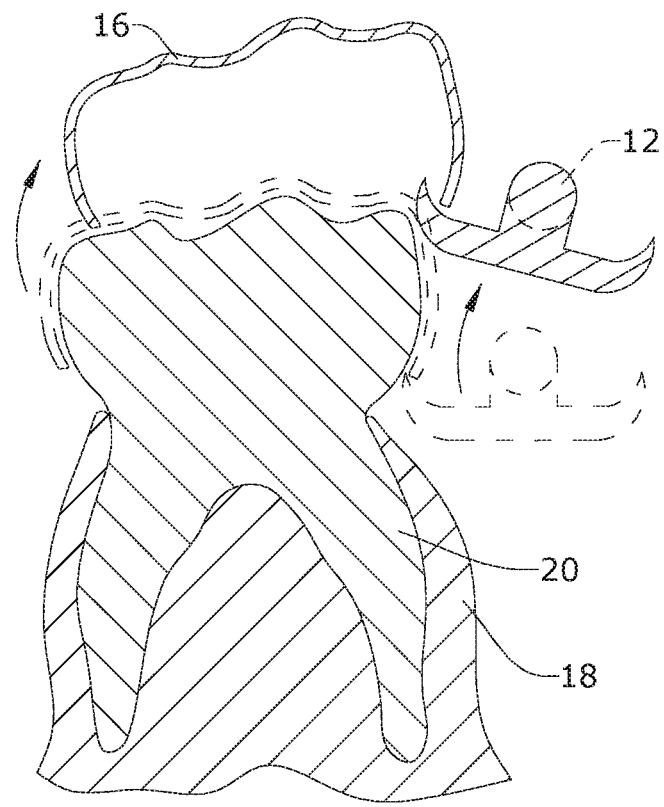
FIG. 5 is a section view of the present invention taken along line 3-3 in FIG. 3.

As shown in FIGS. 4 and 5, the user may insert the pointed tip or beveled edge 26 between one of the user's teeth 20 and a bottom edge of the mouth piece 16. To remove the mouth piece 16, the user may lift and rotate the elongated handle 23.

Figure 6:
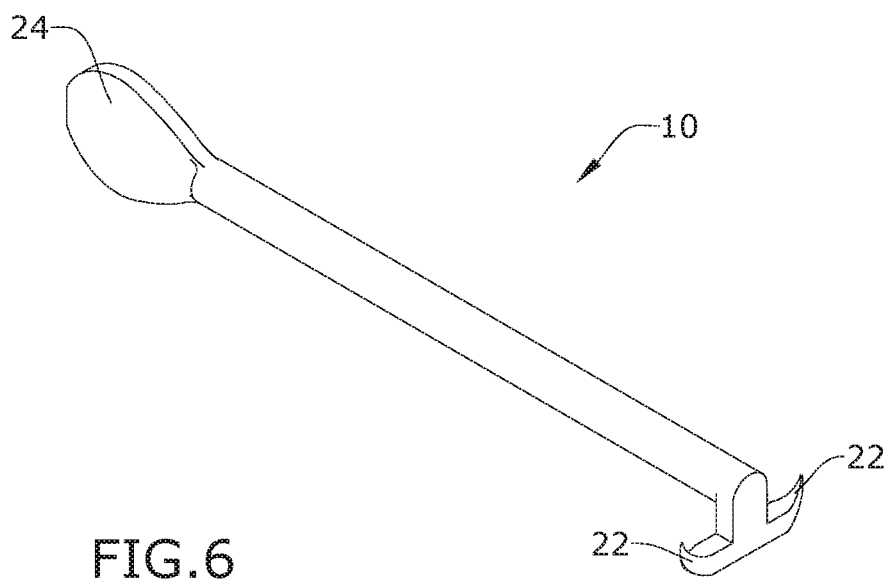
FIG. 6 is a perspective view of an embodiment of the present invention.

Referring to FIG. 6, the present invention may include a mouth piece removal tool 10 having the elongated handle 23, the head portion 21, and the first and second hooks 22. The mouth piece remove tool 10 may further include a gripping portion 24 extending from the first end of the elongated handle 23. The gripping portion 24 includes opposing flat surfaces and allows the user to twist the elongated handle 23 to dislodge the mouth piece.

The present invention may be used by orthodontic aligner patients to remove their aligners easily without having to put their fingers in their mouth. The present invention may also be used to remove retainers and protective mouth guards. A method of removing a mouth piece includes the following steps: providing the mouth piece removal tool described above; insert the second end of the elongated handle into a mouth of a user; place the pointed tip of the first hook underneath a bottom edge of a mouth piece; and lift or rotate the elongated handle, thereby displacing the mouth piece from the user's teeth. The step of lifting or rotating the elongated handle may include lifting or rotating the gripping portion.

It should be understood, of course, that the foregoing relates to exemplary embodiments of the invention and that modifications may be made without departing from the spirit and scope of the invention as set forth in the following claims.

What is claimed is:

1. A unitary mouth piece removal tool comprising:
   an elongated handle comprising a first end opposite a second end along a first longitudinal axis which extends in a first horizontal direction;
   a head portion integrally formed directly on the second end of the elongated handle said head portion having a second longitudinal axis which extends in a vertical direction;
   and a first hook integrally formed directly on a first side of the head portion a first side of the head portion said first hook extending from the head portion along a third longitudinal axis which extends in a second horizontal direction,
   the first hook tapering along a curve to an edge, wherein the edge of the first hook is parallel to the first longitudinal axis;
   wherein the third longitudinal axis is perpendicular to the first longitudinal axis, the second longitudinal axis is perpendicular to the first longitudinal axis, and the third longitudinal axis is perpendicular to the second longitudinal axis;
   and wherein the unitary mouth piece removal tool is made of a polymer.

2. The unitary mouth piece removal tool of claim 1, further comprising a second hook extending from a second side of the head portion along the third longitudinal axis, the second side being opposite the first side, wherein the second hook tapering along a curve to an edge, wherein the edge of the second hook is parallel to the first longitudinal axis.

3. The unitary mouth piece removal tool of claim 1, wherein the elongated handle is linear.

4. The unitary mouth piece removal tool of claim 1, further comprising a gripping portion extending from the first end of the elongated handle, wherein the gripping portion comprises opposing planar surfaces.

5. A unitary mouth piece removal tool comprising:
   an elongated handle comprising a first end opposite a second end having a first longitudinal axis which extends in a first horizontal direction;
   a head portion extending along a second longitudinal a which extends in a vertical direction, the head portion directly joined with the second end of the elongated handle and perpendicular thereto;
   a first hook extending laterally along a third longitudinal axis which extends in a second horizontal direction from a first side of the head portion; and a second hook extending laterally along the third longitudinal axis from a second side of the head portion, the second side being opposite the first side,
   wherein each of the first hook and the second hook are integral with the head portion and taper along a curve from the head portion to form a pointed tip of the first hook, and a pointed tip of the second hook; wherein the pointed tip of the first hook and the pointed tip of the second hook are parallel to the second longitudinal axis.

6. The unitary mouth piece removal tool of claim 5, wherein the pointed tip of the first hook forms a beveled edge and the pointed tip of the second hook forms a beveled edge.

7. A method of removing a mouth piece comprising steps of:
   providing a unitary mouth piece removal tool comprising:
      an elongated handle comprising a first end opposite a second end along a first longitudinal axis which extends in a first horizontal direction;
      an integral head portion extending directly from the second end of the elongated handle along a second longitudinal axis which extends in a vertical direction; and
      an integral first hook extending directly from the head portion along a third longitudinal axis which extends in a second horizontal direction, wherein
   the first hook curving from the third longitudinal axis to form a pointed tip parallel to the second longitudinal axis, and
   wherein the third longitudinal axis is perpendicular to the first longitudinal axis, the second longitudinal axis is perpendicular to the first longitudinal axis, and the third longitudinal axis is perpendicular to the second longitudinal axis;
   inserting the second end of the elongated handle into a mouth of a user;
   placing the pointed tip of the first hook between an edge of a mouth piece and an adjacent molar; and
   rotating the elongated handle around the first longitudinal axis, thereby displacing the mouth piece from the user's teeth.

8. The method of claim 7, wherein the unitary mouth piece removal tool further comprises a second hook extending from a second side of the head portion along the third longitudinal axis, wherein the second hook comprises a pointed tip curving parallel to the second longitudinal axis.

9. The method of claim 7, wherein the unitary mouth piece removal tool further comprises a gripping portion extending from the first end of the elongated handle, wherein the gripping portion comprises opposing planar surfaces.

10. The method of claim 9, wherein the step of rotating the elongated handle comprises lifting and rotating the gripping portion.

* * * * *